United States Patent
Zhang et al.

(10) Patent No.: US 10,534,425 B2
(45) Date of Patent: Jan. 14, 2020

(54) PROCESSING METHOD AND DEVICE FOR SAVING POWER, MOBILE TERMINAL AND CLOUD SERVER

(71) Applicant: BEIJING KINGSOFT INTERNET SECURITY SOFTWARE CO., LTD., Beijing (CN)

(72) Inventors: Kangzong Zhang, Beijing (CN); Qi Yang, Beijing (CN); Yousheng Zheng, Beijing (CN); Yipeng Zou, Beijing (CN); Jian Tang, Beijing (CN); Xuelu Yao, Beijing (CN); Feng Han, Beijing (CN); Guoqiang Jiao, Beijing (CN); Nan Zhang, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 125 days.

(21) Appl. No.: 15/747,068

(22) PCT Filed: Jul. 29, 2016

(86) PCT No.: PCT/CN2016/092358
§ 371 (c)(1),
(2) Date: Jan. 23, 2018

(87) PCT Pub. No.: WO2017/020781
PCT Pub. Date: Feb. 9, 2017

(65) Prior Publication Data
US 2018/0373307 A1    Dec. 27, 2018

(30) Foreign Application Priority Data
Jul. 31, 2015  (CN) .......................... 2015 1 0465345

(51) Int. Cl.
*G06F 1/32*     (2019.01)
*G06F 1/329*    (2019.01)
(Continued)

(52) U.S. Cl.
CPC ............ *G06F 1/329* (2013.01); *G06F 1/3209* (2013.01); *G06F 1/3225* (2013.01);
(Continued)

(58) Field of Classification Search
CPC ...... G06F 1/329; G06F 1/3209; G06F 1/3225; G06F 1/3246; G06F 1/3278; H04W 52/0264
(Continued)

(56) References Cited

U.S. PATENT DOCUMENTS 8,560,134 B1 * 10/2013 Lee ..................... H02J 13/0086
700/291
2008/0212660 A1 * 9/2008 Tzannes ................ H04L 1/0025
375/219
(Continued)

FOREIGN PATENT DOCUMENTS

CN        102200942      9/2011
CN        103941871      7/2014
(Continued)

OTHER PUBLICATIONS

SIPO, Office Action for CN App. No. 201510465345, dated Aug. 1, 2017.
(Continued)

*Primary Examiner* — Volvick Derose
(74) *Attorney, Agent, or Firm* — Hodgson Russ LLP

(57) ABSTRACT

The present disclosure provides a processing method and apparatus for saving power, a mobile terminal, and a cloud server. The method may be applied to a client, and includes: collecting at least one of running information of an appli-
(Continued)

cation in an operating system of the client, behavior information of the application and scenario information related to the application, to generate client characteristic information; uploading the client characteristic information to a cloud server; receiving a power saving strategy generated by the cloud server with respect to the client characteristic information, and performing a power saving operation on the application according to the power saving strategy.

18 Claims, 3 Drawing Sheets

(51) Int. Cl.
*H04W 52/02* (2009.01)
*G06F 1/3225* (2019.01)
*G06F 1/3234* (2019.01)
*G06F 1/3209* (2019.01)
*G06F 1/3246* (2019.01)
*G06F 1/3287* (2019.01)

(52) U.S. Cl.
CPC .......... *G06F 1/3246* (2013.01); *G06F 1/3278* (2013.01); *H04W 52/0264* (2013.01); *G06F 1/3287* (2013.01)

(58) Field of Classification Search
USPC ........................................................ 713/320
See application file for complete search history.

(56) References Cited

U.S. PATENT DOCUMENTS

| 2010/0023788 A1* | 1/2010 | Scott ................. G06F 1/3209 |
| | | 713/320 |
| 2010/0235654 A1 | 9/2010 | Malik et al. |
| 2014/0208131 A1 | 7/2014 | Kano |
| 2014/0237595 A1* | 8/2014 | Sridhara ............ H04L 63/1408 |
| | | 726/23 |
| 2016/0315998 A1* | 10/2016 | Johnson ................ G06N 5/04 |

FOREIGN PATENT DOCUMENTS

| CN | 104166615 | 11/2014 |
| CN | 104182329 | 12/2014 |
| CN | 104239105 | 12/2014 |
| CN | 104267799 | 1/2015 |
| CN | 105138104 | 12/2015 |
| CN | 105138105 | 12/2015 |

OTHER PUBLICATIONS

WIPO, Written Opinion and International Search Report for App. No. PCT/CN2016/092358, dated Oct. 31, 2016.

* cited by examiner

PROCESSING METHOD AND DEVICE FOR SAVING POWER, MOBILE TERMINAL AND CLOUD SERVER

CROSS-REFERENCE TO RELATED APPLICATION

This application is a US national phase application of International Application No. PCT/CN2016/092358, filed Jul. 29, 2016, which is based on and claims priority and benefits of Chinese Patent Application Serial No. 201510465345.9, filed with the State Intellectual Property Office of P. R. China on Jul. 31, 2015, the entire content of which is incorporated herein by reference.

FIELD

The present disclosure relates a mobile terminal technical field, and more particularly, to a processing method and apparatus for saving power, a mobile terminal and a cloud server.

BACKGROUND

With continuous progress of science and technology, smart phones develop more and more rapidly. The smart phone does not only have simple functions such as making a call and sending a message, but also has functions such as viewing news, shopping, booking a ticket, listening to music, and viewing videos, which are realized by installing various applications (APP for short) connected to the internet. However, the more the APPs are, the more power of a battery of the smart phone will be consumed. Thus, how to save power intelligently becomes a bottleneck of the development of the smart phone.

Currently, the smart phone may save power by utilizing its built-in power saving mode or installing a third party application. However, mostly, a corresponding power saving strategy is performed according to power situation, which is not flexible enough. For example, in a state of low power, Internet connections may be all cut off when a screen of the phone is not lighten, and the Internet connections are restored when the screen is lighten up, which may cause a problem that a message cannot be received in real time, thus leading to poor user experience.

SUMMARY

Embodiments according to a first aspect of the present disclosure provide a processing method for saving power. The processing method for saving power is applied to a client, and includes: collecting at least one of running information of an application in an operating system of the client, behavior information of the application and scenario information related to the application, to generate client characteristic information; uploading the client characteristic information to a cloud server; receiving a power saving strategy generated by the cloud server with respect to the client characteristic information, and performing a power saving operation on the application according to the power saving strategy.

Embodiments according to a second aspect of the present disclosure provide a processing method for saving power, including receiving client characteristic information collected by a client, in which the client characteristic information is generated according to at least one of running information of an application in an operating system of the client, behavior information of the application and scenario information related to the application; generating a corresponding power saving strategy with respect to the client characteristic information, and returning the power saving strategy to the client, so that the client performs a power saving operation on the application according to the power saving strategy.

Embodiments according to a third aspect of the present disclosure provide a processing apparatus for saving power, including: a collecting module, configured to collect at least one of running information of an application in an operating system of the client, behavior information of the application and scenario information related to the application, so as to generate client characteristic information; an uploading module, configured to upload the client characteristic information to a cloud server; and a processing module, configured to receive a power saving strategy generated by the cloud server with respect to the client characteristic information, and perform a power saving operation on the application according to the power saving strategy.

Embodiments according to a fourth aspect of the present disclosure provide another processing apparatus for saving power, including: a receiving module, configured to receive client characteristic information collected by a client, in which the client characteristic information is generated according to at least one of running information of an application in an operating system of the client, behavior information of the application and scenario information related to the application; and a returning module, configured to generate a power saving strategy with respect to the client characteristic information, and return the power saving strategy to the client, so that the client performs a power saving operation on the application according to the power saving strategy.

Embodiments according to a six aspect of the present disclosure provide a cloud server. The cloud server includes a processor and a memory configured to store instructions executable by the processor, in which, the processor is configured to run a program corresponding to the instructions by reading the executable instructions stored in the memory, so as to perform the processing method for saving power according to embodiments of the second aspect of the present disclosure.

Embodiments according to a seventh aspect of the present disclosure provide a computer-readable storage medium, stored with instructions that when executed by a processor of a mobile terminal, cause the mobile terminal to perform the processing method for saving power according to embodiments of the first aspect of the present disclosure.

Embodiments according to an eighth aspect of the present disclosure provide a computer-readable storage medium, stored with instructions that when executed by a processor of a cloud server, cause the cloud server to perform the processing method for saving power according to embodiments of the second aspect of the present disclosure.

Embodiments according to a ninth aspect of the present disclosure provide a computer program, which when executed by a processor of a mobile terminal, performs the processing method for saving power according to embodiments of the first aspect of the present disclosure.

Embodiments according to a tenth aspect of the present disclosure provide a computer program, which when executed by a processor of a cloud server, performs the processing method for saving power according to embodiments of the second aspect of the present disclosure.

Additional aspects and advantages of embodiments of present disclosure will be given in part in the following

DETAILED DESCRIPTION

Figure 1:
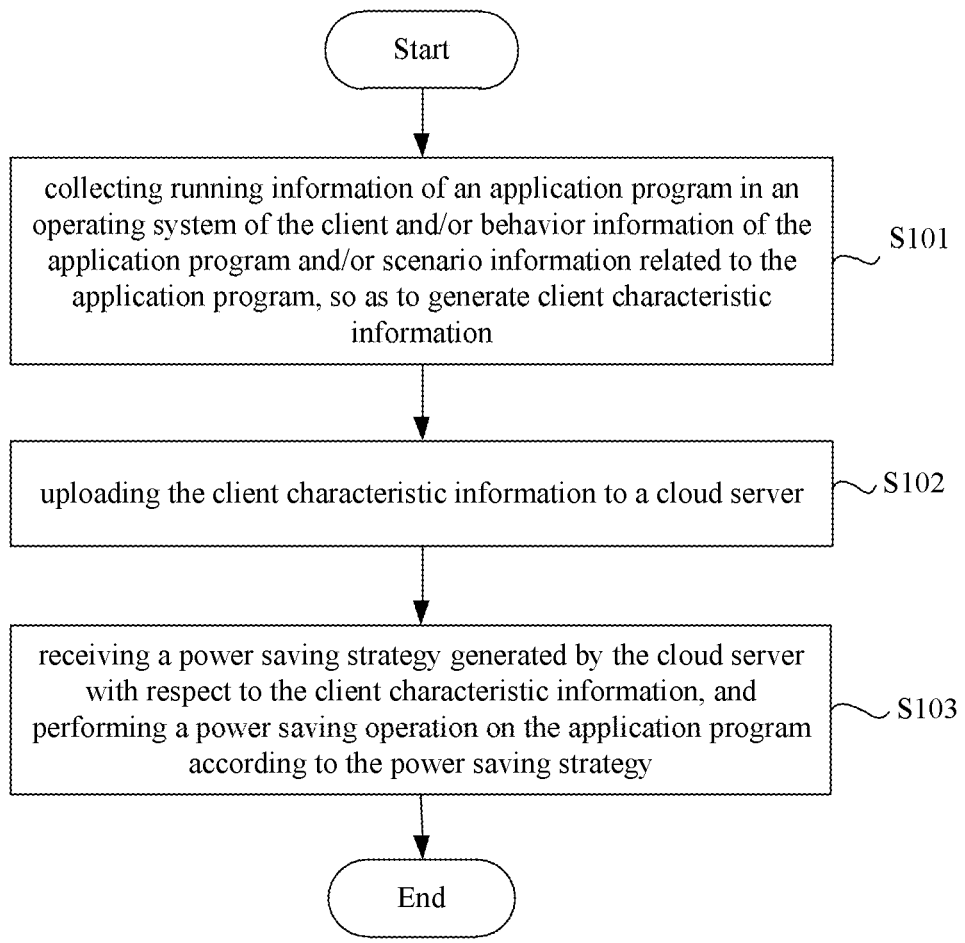
FIG. 1 is a flow chart of a processing method for saving power according to an embodiment of the present disclosure.

Reference will now be made in detail to exemplary embodiments, examples of which are illustrated in the accompanying drawings, wherein the same or similar elements and the elements having same or similar functions are denoted by like reference numerals throughout the descriptions. Embodiments described herein with reference to drawings are explanatory and used to generally understand the present disclosure, and shall not be construed to limit the present disclosure.

The processing method and apparatus for saving power, the mobile terminal and the cloud server according to embodiments of the present disclosure will be described below with reference to accompany drawings.

FIG. 1 is a flow chart of a processing method for saving power according to an embodiment of the present disclosure. This embodiment is applied to a client, and as illustrated in FIG. 1, the method may include following acts.

At block S101, running information of an application in an operating system of the client, and/or behavior information of the application, and/or scenario information related to the application are collected, so as to generate client characteristic information.

In detail, the running information of the application may include a name of the application, type information of the application, a runtime of the application, network flow consumption information of the application, memory usage information of the application in the client and CPU usage information of the application in the client, and the like. For example, Wechat is a social application, which uses 2% of memory resource and 4% of CPU resource.

The behavior information of the application may include designated folder information corresponding to the application, designated process information corresponding to the application, account login state of the application, system service information corresponding to the application and priority information of a process corresponding to the application, and the like. For example, Wechat is installed in a folder of "tencent/MicroMsg", is currently in a logged in state, and needs to call which system service information.

The scenario information related to the application may include an outdoor scenario, an indoor scenario, a sleeping scenario, an aviation scenario, an in-vehicle scenario, etc. For example, at present, the client is in the outdoor scenario.

When the running information, the behavior information and the scenario information are obtained, these information may be organized to generate the client characteristic information.

At block S102, the client characteristic information is uploaded to a cloud server.

When the client characteristic information is generated, the client characteristic information may be uploaded to the cloud server. The cloud server may analyze the client characteristic information to generate a power saving strategy and return the power saving strategy.

At block S103, a power saving strategy generated by the cloud server with respect to the client characteristic information is received, and a power saving operation is performed on the application according to the power saving strategy.

In embodiments of the present disclosure, the power saving strategy generated by the cloud server with respect to the client characteristic information may be received, and the power saving operation may be performed on the application according to the power saving strategy. In detail, it may be first determined whether it needs to call a system permission to perform the power saving operation on the application. If it does not need to call the system permission, the power saving operation is performed on the application directly. If it needs to call the system permission, an intermediate plug-in SKEY which is pre-installed at a certain location of the operation system and has a function of authorizing the system permission may be called, and the power saving operation is performed on the application through the intermediate plug-in SKEY.

In detail, a plurality of power saving operations may be performed on the application according to the power saving strategy. For instance, a killing process operation may be performed, or a force-to-stop operation may be performed on the application, or a forbid-to-autostart operation may be performed on the application, or a restart operation may be performed on the application, or the application may be forbidden to perform network connection, or a unloading operation may be performed on the application.

For example, there is a music playing APP which is currently in a playing state. During a playing process, the APP may perform an act of connecting to the Internet such as automatically updating lyrics in the background, and thus the APP may be disconnected from the Internet without pausing the playing operation, such that a user can have the APP disconnected from the Internet without affecting enjoyment of the music, thus avoiding an unnecessary power consumption operation.

For another example, when an APP has not been used for 12 hours, the APP may be closed to save power. However, if the APP is a kind of communication software and is in a logged-in state, the APP may not be closed so that the user can receive a message in real time, therefore not affecting usage experience of the user.

It should be understood that the above examples are just for two simple circumstances, it may be more complicated in actual practice. As time goes on, more client characteristic information which has never appeared before may appear and the power saving strategy may be updated accordingly, which will no longer be a simple operation such as stopping updating lyrics automatically, but be a more complicated power saving strategy or a combination of a plurality of power saving strategies, which will not be listed one by one herein.

Besides, after the power saving strategy is received, it may be stored locally. When disconnection from the cloud server is detected, the client may obtain a corresponding power saving strategy locally and perform the power saving operation on the application according to the power saving strategy. For example, after the client receives the power saving strategy returned from the cloud server, assuming that the client currently cannot communicate with the cloud server, then the client may obtain the power saving strategy stored locally before and perform the power saving operation on the application.

With the processing method for saving power according to embodiments of the present disclosure, by collecting client characteristic information of the application in the operating system of the client, uploading the client characteristic information to the cloud server, receiving the power saving strategy generated by the cloud server with respect to the client characteristic information, and performing the power saving operation on the application according to the power saving strategy, the power saving process may be more intelligent and more flexible, thus improving the user experience.

Figure 2:
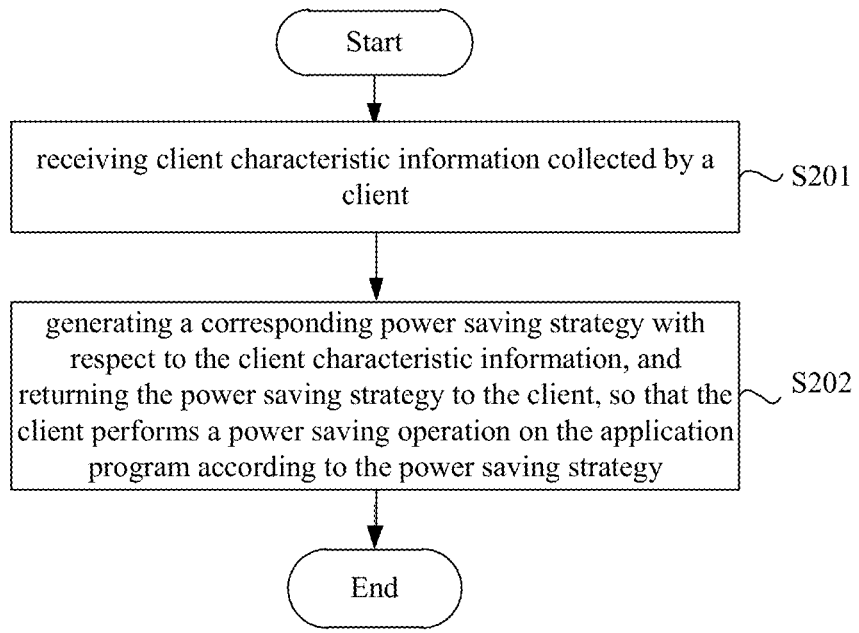
FIG. 2 is a flow chart of a processing method for saving power according to another embodiment of the present disclosure.

FIG. 2 is a flow chart of a processing method for saving power according to another embodiment of the present disclosure. This embodiment is applied to a client, and as illustrated in FIG. 2, the method may include following acts.

At block S201, client characteristic information collected by a client is received.

In detail, the client characteristic information is generated according to running information of an application in an operating system of the client, and/or behavior information of the application and/or scenario information related to the application.

The running information of the application may include a name of the application, type information of the application, a runtime of the application, network flow consumption information of the application, memory usage information of the application in the client and CPU usage information of the application in the client. For example, Wechat is a social application, which uses 2% of memory resource and 4% of CPU resource.

The behavior information of the application may include designated folder information corresponding to the application, designated process information corresponding to the application, account login state of the application, system service information corresponding to the application and priority information of a process corresponding to the application. For example, Wechat is installed in a folder of "tencent/MicroMsg", currently in a logged in state, and needs to call which system service information.

The scenario information related to the application may include an outdoor scenario, an indoor scenario, a sleeping scenario, an aviation scenario, an in-vehicle scenario, etc. For example, at present, the client is in the outdoor scenario.

At block S202, a corresponding power saving strategy is generated with respect to the client characteristic information, and the power saving strategy is returned to the client, so that the client performs a power saving operation on the application according to the power saving strategy.

In detail, the corresponding power saving strategy may be selected from a database according to the client characteristic information and returned to the client; or the corresponding power saving strategy may be set by analyzing the client characteristic information manually and then returned to the client.

In an embodiment, the database is stored in the cloud server and is configured to store the power saving strategy. If a power saving strategy corresponding to current client characteristic information has already existed in the database, the corresponding power saving strategy may be selected from the database directly and then returned to the client. If the current client characteristic information has never appeared before, then the client characteristic information may be analyzed manually to set the corresponding power saving strategy, and then the power saving strategy is returned to the client.

Besides, after the corresponding power saving strategy is set by analyzing the client characteristic information manually, the power saving strategy may be saved into the database.

With the processing method for saving power according to embodiments of the present disclosure, by receiving the client characteristic information collected by the client, generating the power saving strategy with respect to the client characteristic information, and returning the power saving strategy to the client, the client may perform the power saving operation on the application according to the power saving strategy, which is more intelligent and more flexible, thus improving the user experience.

To achieve the above embodiments, the present disclosure also provides a processing apparatus for saving power.

Figure 3:
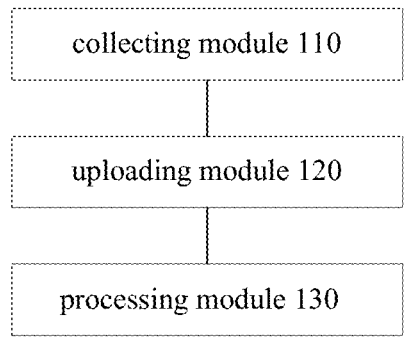
FIG. 3 is a block diagram of a processing apparatus for saving power according to an embodiment of the present disclosure.

FIG. 3 is a block diagram of a processing apparatus for saving power according to an embodiment of the present disclosure. As illustrated in FIG. 3, the apparatus includes a collecting module 110, an uploading module 120 and a processing module 130.

The collecting module 110 is configured to collect running information of an application in an operating system of the client, and/or behavior information of the application and/or scenario information related to the application, so as to generate client characteristic information.

In detail, the running information of the application may include a name of the application, type information of the application, a runtime of the application, network flow consumption information of the application, memory usage information of the application and CPU usage information of the application, and the like. For example, Wechat is a social application, which uses 2% of memory resource and 4% of CPU resource.

The behavior information of the application may include designated folder information corresponding to the application, designated process information corresponding to the application, account login state of the application, system service information corresponding to the application and priority information of a process corresponding to the application, etc. For example, Wechat is installed in a folder of "tencent/MicroMsg", is currently in a logged in state, and needs to call which system service information.

The scenario information related to the application may include an outdoor scenario, an indoor scenario, a sleeping scenario, an aviation scenario, an in-vehicle scenario, etc. For example, at present, the client is in the outdoor scenario.

When the running information, the behavior information and the scenario information are obtained, these information may be organized to generate the client characteristic information.

The uploading module 120 is configured to upload the client characteristic information to a cloud server.

After the client characteristic information is generated, the uploading module 120 may upload the client characteristic information to the cloud server. The cloud server may analyze the client characteristic information to generate a power saving strategy and return the power saving strategy.

The processing module 130 is configured to receive the power saving strategy generated by the cloud server with respect to the client characteristic information, and perform a power saving operation on the application according to the power saving strategy.

In embodiments of the present disclosure, the processing module 130 may receive the power saving strategy generated by the cloud server with respect to the client characteristic information, and perform the power saving operation on the application according to the power saving strategy. In detail, it may be first determined whether it needs to call a system permission to perform the power saving operation on the application. If it does not need to call the system permission, the power saving operation is performed on the application directly. If it needs to call the system permission, an intermediate plug-in SKEY which is pre-installed at a certain location of the operation system and has a function of authorizing the system permission may be called, and the power saving operation is performed on the application through the intermediate plug-in SKEY.

In detail, a plurality of power saving operations may be performed on the application according to the power saving strategy. For instance, a killing process operation may be performed, or a force-to-stop operation may be performed on the application, or a forbid-to-autostart operation may be performed on the application, or a restart operation may be performed on the application, or the application may be forbidden to perform network connection, or a unloading operation may be performed on the application.

For example, there is a music playing APP which is currently in a playing state. During a playing process, the APP may perform an act of connecting to the Internet such as automatically updating lyrics in the background, and thus the APP may be disconnected from the Internet without pausing the playing operation, such that a user can have the APP disconnected from the Internet without affecting enjoyment of the music, thus avoiding an unnecessary power consumption operation.

For another example, when an APP has not been used for 12 hours, the APP may be closed to save power. However, if the APP is a kind of communication software and is in a logged-in state, the APP may not be closed so that the user can receive a message in real time, therefore not affecting usage experience of the user.

It should be understood that the above examples are just for two simple circumstances, it may be more complicated in actual practice. As time goes on, more client characteristic information which has never appeared before may appear and the power saving strategy may be updated accordingly, which will no longer be a simple operation such as stopping updating lyrics automatically, but be a more complicated power saving strategy or a combination of a plurality of power saving strategies, which will not be listed one by one herein.

Figure 4:
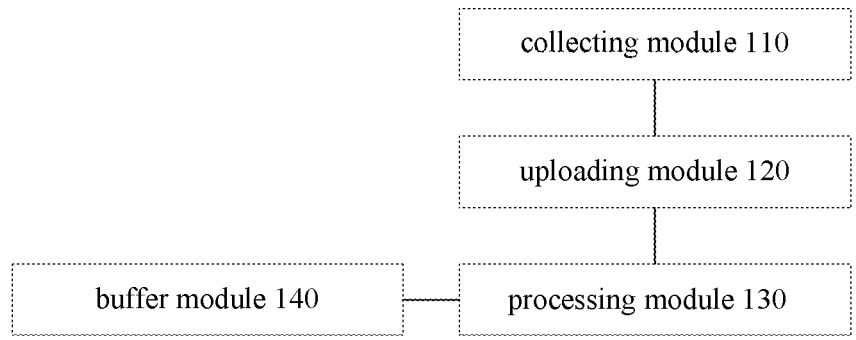
FIG. 4 is a block diagram of a processing apparatus for saving power according to an embodiment of the present disclosure.

Besides, as illustrated in FIG. 4, the processing apparatus for saving power according to embodiments of the present disclosure may further include a buffer module 140.

The buffer module 140 is configured to store the power saving strategy locally after the power saving strategy is received. When disconnection from the cloud server is detected, the processing module 130 may obtain a corresponding power saving strategy locally and perform the power saving operation on the application according to the power saving strategy. For example, after the client receives the power saving strategy returned from the cloud server, assuming that the client currently cannot communicate with the cloud server, then the client may obtain the power saving strategy stored locally before and perform the power saving operation on the application.

With the processing apparatus for saving power according to embodiments of the present disclosure, by collecting client characteristic information of the application in the operating system of the client, uploading the client characteristic information to the cloud server, receiving the power saving strategy generated by the cloud server with respect to the client characteristic information, and performing the power saving operation on the application according to the power saving strategy, the power saving process may be more intelligent and more flexible, thus improving the user experience.

Figure 5:
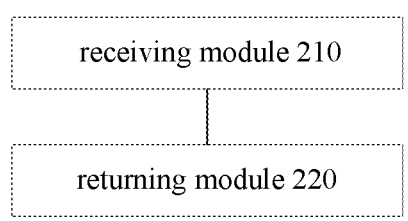
FIG. 5 is a block diagram of a processing apparatus for saving power according to another embodiment of the present disclosure.

FIG. 5 is a block diagram of a processing apparatus for saving power according to another embodiment of the present disclosure. As illustrated in FIG. 5, the apparatus includes a receiving module 210 and a returning module 220.

The receiving module 210 is configured to receive client characteristic information collected by a client.

In detail, the client characteristic information is generated according to running information of an application in an operating system of the client, and/or behavior information of the application and/or scenario information related to the application.

The running information of the application may include a name of the application, type information of the application, a runtime of the application, network flow consumption information of the application, memory usage information of the application, and CPU usage information of the application in the client, etc. For example, Wechat is a social application, which uses 2% of memory resource and 4% of CPU resource.

The behavior information of the application may include designated folder information corresponding to the application, designated process information corresponding to the application, account login state of the application, system service information corresponding to the application and priority information of a process corresponding to the application. For example, Wechat is installed in a folder of "tencent/MicroMsg", is currently in a logged in state, and needs to call which system service information.

The scenario information related to the application may include an outdoor scenario, an indoor scenario, a sleeping scenario, an aviation scenario, an in-vehicle scenario, etc. For example, at present, the client is in the outdoor scenario.

The returning module 220 is configured to generate a power saving strategy with respect to the client characteristic information, and return the power saving strategy to the client, so that the client performs a power saving operation on the application according to the power saving strategy.

In detail, the returning module 220 may select the corresponding power saving strategy from a database according to the client characteristic information and send the power saving strategy to the client; or set the corresponding power saving strategy by analyzing the client characteristic information manually and then send the power saving strategy to the client.

In an embodiment, the database is stored in the cloud server and is configured to store the power saving strategy. If a power saving strategy corresponding to current client characteristic information has already existed in the database, the corresponding power saving strategy may be selected from the database directly and then returned to the client. If the current client characteristic information has never appeared before, then the client characteristic information may be analyzed manually to set the corresponding power saving strategy and then the power saving strategy is returned to the client.

Figure 6:
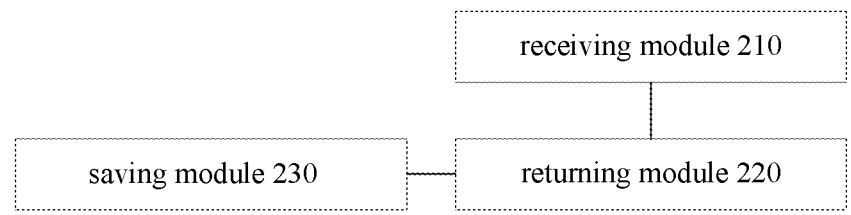
FIG. 6 is a block diagram of a processing apparatus for saving power according to another embodiment of the present disclosure.

Besides, as illustrated in FIG. 6, the processing apparatus for saving power according to embodiments of the present disclosure may further include a saving module 230.

The saving module 230 is configured to save the power saving strategy into the database after the corresponding power saving strategy is set.

With the processing apparatus for saving power according to embodiments of the present disclosure, by receiving the client characteristic information collected by the client, generating the power saving strategy with respect to the client characteristic information, and returning the power saving strategy to the client, the client may perform the power saving operation on the application according to the power saving strategy, which is more intelligent and more flexible, thus improving the user experience.

Figure 7:
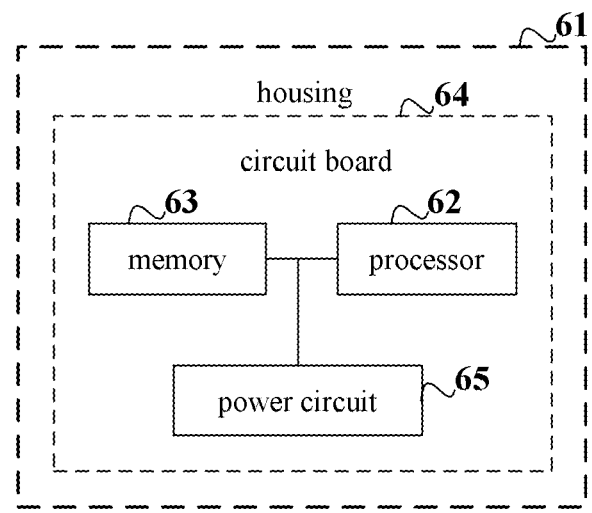
FIG. 7 is a block diagram of a mobile terminal according to an embodiment of the present disclosure.

To achieve the above embodiments, the present disclosure also provides a mobile terminal. FIG. 7 is a block diagram of a mobile terminal according to an embodiment of the present disclosure. As illustrated in FIG. 7, the mobile device includes a housing 61, a processor 62, a memory 63, a circuit board 64 and a power circuit 65, in which, the circuit board 64 is arranged inside a space enclosed by the housing 61, the processor 62 and the memory 63 are disposed on the circuit board 64; the power circuit 65 is configured to provide power for respective circuits or components of the mobile terminal; the memory 63 is configured to store executable program codes; the processor 62 is configured to run a program corresponding to the executable program codes by reading the executable program codes stored in the memory 63, so as to perform following acts.

At block S101', running information of an application in an operating system of the client, and/or behavior information of the application, and/or scenario information related to the application are collected, so as to generate client characteristic information.

In detail, the running information of the application may include a name of the application, type information of the application, a runtime of the application, network flow consumption information of the application, memory usage information of the application in the client, and CPU usage information of the application in the client, etc. For example, Wechat is a social application, which uses 2% of memory resource and 4% of CPU resource.

The behavior information of the application may include designated folder information corresponding to the application, designated process information corresponding to the application, account login state of the application, system service information corresponding to the application and priority information of a process corresponding to the application, etc. For example, Wechat is installed in a folder of "tencent/MicroMsg", is currently in a logged in state, and needs to call which system service information.

The scenario information related to the application may include an outdoor scenario, an indoor scenario, a sleeping scenario, an aviation scenario, an in-vehicle scenario, etc. For example, at present, the client is in the outdoor scenario.

When the running information, the behavior information and the scenario information are obtained, these information may be organized to generate the client characteristic information.

At block S102', the client characteristic information is uploaded to a cloud server.

After the client characteristic information is generated, the client characteristic information may be uploaded to the cloud server. The cloud server may analyze the client characteristic information to generate a power saving strategy and return the power saving strategy.

At block S103', the power saving strategy generated by the cloud server with respect to the client characteristic information is received, and a power saving operation is performed on the application according to the power saving strategy.

In embodiments of the present disclosure, the power saving strategy generated by the cloud server with respect to the client characteristic information may be received, and the power saving operation may be performed on the application according to the power saving strategy. In detail, it may be first determined whether it needs to call a system permission to perform the power saving operation on the application. If it does not need to call the system permission, the power saving operation is performed on the application directly. If it needs to call the system permission, an intermediate plug-in SKEY which is pre-installed at a certain location of the operation system and has a function of authorizing the system permission may be called, and the power saving operation is performed on the application through the intermediate plug-in SKEY.

In detail, a plurality of power saving operations may be performed on the application according to the power saving strategy. For instance, a killing process operation may be performed, or a force-to-stop operation may be performed on the application, or a forbid-to-autostart operation may be performed on the application, or a restart operation may be performed on the application, or the application may be forbidden to perform network connection, or a unloading operation may be performed on the application.

For example, there is a music playing APP which is currently in a playing state. During a playing process, the APP may perform an act of connecting to the Internet such as automatically updating lyrics in the background, and thus the APP may be disconnected from the Internet without pausing the playing operation, such that a user can have the APP disconnected from the Internet without affecting enjoyment of the music, thus avoiding an unnecessary power consumption operation.

For another example, when an APP has not been used for 12 hours, the APP may be closed to save power. However, if the APP is a kind of communication software and is in a logged-in state, the APP may not be closed so that the user can receive a message in real time, therefore not affecting usage experience of the user.

It should be understood that the above examples are just for two simple circumstances, it may be more complicated in actual practice. As time goes on, more client characteristic information which never occurred before may appear and the power saving strategy may be updated accordingly, which will no longer be a simple operation such as stopping updating lyrics automatically, but be a more complicated power saving strategy or a combination of a plurality of power saving strategies, which will not be listed one by one herein.

Besides, after the power saving strategy is received, it may be stored locally. When disconnection from the cloud server is detected, the client may obtain a corresponding power saving strategy locally and perform the power saving operation on the application according to the power saving strategy. For example, after the client receives the power saving strategy returned from the cloud server, assuming that the client currently cannot communicate with the cloud server, then the client may obtain the power saving strategy stored locally before and perform the power saving operation on the application.

The mobile terminal in embodiments of the present disclosure may include a mobile phone, a smart phone, a laptop computer, a digital broadcasting receiver, a personal digital assistant (PDA), a panel computer (PAD), a portable multimedia player (PMP), a navigation device, a desktop computer, and other terminal devices.

With the mobile terminal according to embodiments of the present disclosure, by collecting client characteristic information of the application in the operating system of the client, uploading the client characteristic information to the cloud server, receiving the power saving strategy generated by the cloud server with respect to the client characteristic information, and performing the power saving operation on the application according to the power saving strategy, the power saving process may be more intelligent and more flexible, thus improving the user experience.

To achieve the above embodiments, the present disclosure also provides a cloud server. The cloud server includes a processing apparatus for saving power according to another embodiment of the present disclosure as illustrated in FIG. 5 or 6.

Figure 8:
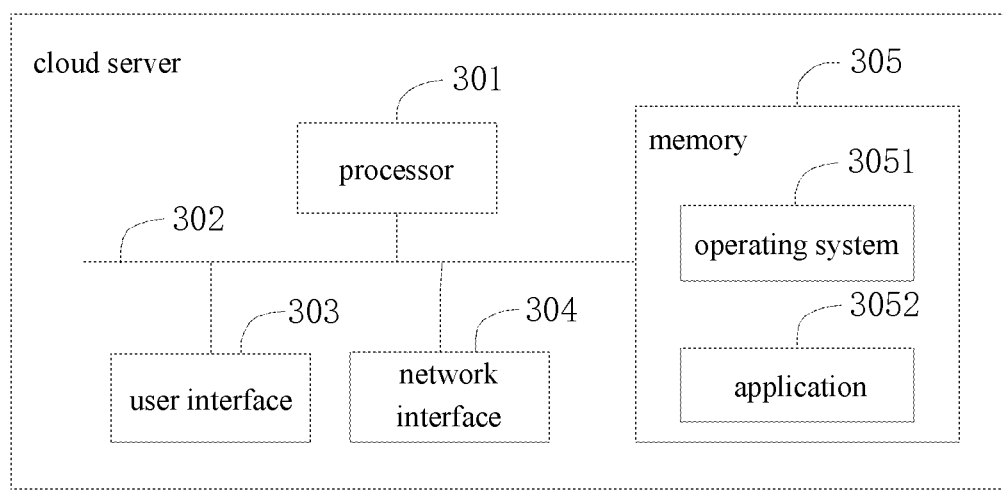
FIG. 8 is a block diagram of a cloud server according to an embodiment of the present disclosure.

With reference to FIG. 8, FIG. 8 is a block diagram of a cloud server according to an embodiment of the present disclosure, which may be configured to perform the processing method for saving power disclosed in embodiments of the present disclosure. The cloud server may include at least one processor 301, for example a CPU, at least one network interface 304 or other user interface 303, a memory 305 and at least one communication bus 302. The communication bus 302 is configured to achieve communication and connection among these components. In detail, the user interface 303 may alternatively include a USB interface and other standard interfaces and wired interfaces. Alternatively, the network interface 304 may include a Wi-Fi interface and other wireless interfaces. The memory 305 may include a high-speed RAM memory, or may further include a non-volatile memory, for example at least one disk memory. Alternatively, the memory 305 may include at least one memory device away from the above processor 301. As illustrated in FIG. 8, the memory 305, as a kind of computer storage medium, may include an operating system 3051 and an application 3052.

In some embodiments, the memory 305 stores executable modules or data structure, or their subsets, or their extension sets.

The operating system 3051 includes various system programs, and is configured to implement various basis services and to process hardware-based tasks.

The application 3052 includes various applications including a setting program of data block parameter of target network data, a dividing program of a target data block, a comparing program of the target data block and data block in a database, and a deleting program of the target data block, and the like, and is configured to implement various application services.

In detail, the processor 301 is configured to call the programs stored in the memory 305 and perform actions of:

receiving client characteristic information collected by a client, in which the client characteristic information is generated according to at least one of running information of an application in an operating system of the client, behavior information of the application and scenario information related to the application;

generating a corresponding power saving strategy with respect to the client characteristic information, and returning the power saving strategy to the client, so that the client performs a power saving operation on the application according to the power saving strategy.

The specific execution process of the above steps by the processor 301 and steps further performed through running program by the processor 301 can refer to description of above method embodiments, which will not described in detail.

With the cloud server according to embodiments of the present disclosure, by receiving the client characteristic information collected by the client, generating the power saving strategy with respect to the client characteristic information, and returning the power saving strategy to the client, the client may perform the power saving operation on the application according to the power saving strategy, which is more intelligent and more flexible, thus improving the user experience.

Embodiments of the present disclosure also provide a computer-readable storage medium, stored with instructions that when executed by a processor of a mobile terminal, cause the mobile terminal to perform the processing method for saving power according to embodiments of the of the present disclosure as illustrated with reference to FIG. 1.

Embodiments of the present disclosure also provide another computer-readable storage medium, stored with instructions that when executed by a processor of a cloud server, cause the cloud server to perform the processing method for saving power according to embodiments of the of the present disclosure as illustrated with reference to FIG. 2.

Embodiments of the present disclosure also provide a computer program, when executed by a processor of a mobile terminal, performing the processing method for saving power according to embodiments of the of the present disclosure as illustrated with reference to FIG. 1.

Embodiments of the present disclosure also provide a computer program, when executed by a processor of a cloud server, performing the processing method for saving power according to embodiments of the of the present disclosure as illustrated with reference to FIG. 2.

It should be noted that in the present disclosure, relationship terms such as "first" and "second" are used herein only for purposes of distinguishing an entity from another entity or distinguishing an operation from another operation, and are not intended to indicate or imply any relationships or orders existing in these operations or entities. Moreover, terms "comprise", "include" or any other variants thereof are intended to encompass a non-exclusive inclusion, so that a process, a method, an item or a device "comprises" a series of elements may not only include those elements per se but also include other elements which are not explicitly listed, or further include inherent elements of the process, method, item or device. Under a condition that no more limitation exists, an element restricted by a statement of "comprising a . . ." does not exclude that the process, method, item or device comprising the element from further comprising other same elements.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer-readable medium comprise but are not limited to: an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

In addition, terms such as "first" and "second" are used herein only for purposes of description and are not intended to indicate or imply relative importance or significance or to imply the number of indicated technical features. Thus, the feature defined with "first" and "second" may comprise one or more of this feature either in a way of imply or indicate. In the description of the present disclosure, "a plurality of" means two or more than two, for example, two, three, etc., unless specifically and particularly prescribed otherwise.

In the present invention, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via intervening structures; may also be inner communications of two elements, or interactions of two elements, unless specified otherwise. The particular meanings of above terms can be understood by those skilled in the art according to specific situations.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. In addition, those skilled in the art could combine or associate different embodiments, examples or characters of different embodiments or examples, as long as there are no contradictories.

Although embodiments of present disclosure have been shown and described above, it should be understood that above embodiments are just explanatory, and cannot be construed to limit the present disclosure, for those skilled in the art, changes, alternatives, and modifications can be made in the embodiments without departing from spirit, principles, and scope of the present disclosure.

What is claimed is:

1. A processing method for saving power, applied to a client, comprising:
    collecting at least one of running information of an application in an operating system of the client, behavior information of the application and scenario information related to the application, to generate client characteristic information;
    uploading the client characteristic information to a cloud server; and
    receiving a power saving strategy generated by the cloud server with respect to the client characteristic information, and performing a power saving operation on the application according to the power saving strategy;
    wherein performing a power saving operation on the application according to the power saving strategy comprises:
        determining whether it needs to call a system permission to perform the power saving operation on the application;
        when it does not need to call the system permission, performing the power saving operation on the application directly;
        when it needs to call the system permission, calling an intermediate plug-in SKEY which is pre-installed at a certain location of the operating system and has a function of authorizing the system permission, and performing the power saving operation on the application through the intermediate plug-in SKEY.

2. The method according to claim 1, wherein, the running information of the application comprises at least one of:
    a name of the application;
    type information of the application;
    runtime of the application;
    network flow consumption information of the application;
    memory usage information of the application in the client; and
    CPU usage information of the application in the client,
    wherein, the behavior information of the application comprises at least one of:
        designated folder information corresponding to the application;
        designated process information corresponding to the application; account login state of the application;
        system service information corresponding to the application; and
        priority information of a process corresponding to the application.

3. The method according to claim 1, wherein, performing a power saving operation on the application according to the power saving strategy comprises:

performing a killing process operation on the application according to the power saving strategy; or performing a force-to-stop operation on the application according to the power saving strategy; or performing a forbid-to-autostart operation on the application according to the power saving strategy; or performing a restart operation on the application according to the power saving strategy; or forbidding the application to perform network connection according to the power saving strategy; or performing an unloading operation on the application according to the power saving strategy.

4. The method according to claim 1, further comprising:
after receiving the power saving strategy, storing the power saving strategy locally.

5. The method according to claim 4, further comprising:
when detecting a disconnection from the cloud server, obtaining the power saving strategy locally by the client, and performing the power saving operation on the application according to the power saving strategy.

6. The method according to claim 1, wherein performing the power saving operation on the application according to the power saving strategy enters the client into a power saving mode;
wherein the scenario information related to the application comprises an outdoor scenario, or an indoor scenario, or a sleeping scenario, or an aviation scenario, or an in-vehicle scenario; and
wherein when the client is in the power saving mode, the client receives an updated power saving strategy from the cloud server based on changes in the client characteristic information.

7. A processing apparatus for saving power, comprising:
a processor; and
a memory, configured to store instructions executable by the processor,
wherein the processor is configured to:
collect at least one of running information of an application in an operating system of the client, behavior information of the application and scenario information related to the application, so as to generate client characteristic information;
upload the client characteristic information to a cloud server; and
receive a power saving strategy generated by the cloud server with respect to the client characteristic information, and perform a power saving operation on the application according to the power saving strategy;
wherein, the processor is further configured to:
determine whether it needs to call a system permission to perform the power saving operation on the application;
when it does not need to call the system permission, perform the power saving operation on the application directly;
when it needs to call the system permission, call an intermediate plug-in SKEY which is pre-installed at a certain location of the operating system and has a function of authorizing the system permission, and perform the power saving operation on the application through the intermediate plug-in SKEY.

8. A processing method for saving power, applied to a cloud server, comprising:
receiving client characteristic information collected by a client, wherein the client characteristic information is generated according to at least one of running information of an application in an operating system of the client, behavior information of the application and scenario information related to the application;
generating a corresponding power saving strategy with respect to the client characteristic information, and returning the power saving strategy to the client, so that the client performs a power saving operation on the application according to the power saving strategy;
wherein, performing the power saving operation on the application according to the power saving strategy comprises:
determining whether it needs to call a system permission to perform the power saving operation on the application;
when it does not need to call the system permission, performing the power saving operation on the application directly;
when it needs to call the system permission, calling an intermediate plug-in SKEY which is pre-installed at a certain location of the operating system and has a function of authorizing the system permission, and performing the power saving operation on the application through the intermediate plug-in SKEY.

9. The method according to claim 8, wherein, the running information of the application comprises at least one of:
a name of the application;
type information of the application; runtime of the application;
network flow consumption information of the application;
memory usage information of the application in the client; and
CPU usage information of the application in the client.

10. The method according to claim 8, wherein, the behavior information of the application comprises at least one of:
designated folder information corresponding to the application;
designated process information corresponding to the application;
account login state of the application;
system service information corresponding to the application; and
priority information of a process corresponding to the application.

11. The method according to claim 8, wherein, generating a corresponding power saving strategy with respect to the client characteristic information comprises:
selecting the corresponding power saving strategy from a database according to the client characteristic information and returning the power saving strategy to the client; or
setting the corresponding power saving strategy by analyzing the client characteristic information manually, and returning the power saving strategy to the client.

12. The method according to claim 11, further comprising:
after setting the corresponding power saving strategy, saving the power saving strategy to the database.

13. The method according to claim 8, wherein performing the power saving operation on the application according to the power saving strategy enters the client into a power saving mode;
wherein the scenario information related to the application comprises an outdoor scenario, or an indoor scenario, or a sleeping scenario, or an aviation scenario, or an in-vehicle scenario; and wherein when the client is in the power saving mode, the client receives an updated power saving strategy from the cloud server based on changes in the client characteristic information.

14. The apparatus according to claim 7, wherein performing the power saving operation on the application according to the power saving strategy enters the client into a power saving mode;
  wherein the scenario information related to the application comprises an outdoor scenario, or an indoor scenario, or a sleeping scenario, or an aviation scenario, or an in-vehicle scenario; and
  wherein when the client is in the power saving mode, the client receives an updated power saving strategy from the cloud server based on changes in the client characteristic information.

15. The apparatus according to claim 7, wherein, the running information of the application comprises at least one of:
  a name of the application; type information of the application;
  runtime of the application;
  network flow consumption information of the application;
  memory usage information of the application in the client; and
  CPU usage information of the application in the client,
  wherein, the behavior information of the application comprises at least one of:
    designated folder information corresponding to the application;
    designated process information corresponding to the application;
    account login state of the application;
    system service information corresponding to the application; and
    priority information of a process corresponding to the application.

16. The apparatus according to claim 7, wherein, the processor is configured to:
  perform a killing process operation on the application according to the power saving strategy; or
  perform a force-to-stop operation on the application according to the power saving strategy; or
  perform a forbid-to-autostart operation on the application according to the power saving strategy; or
  perform a restart operation on the application according to the power saving strategy; or
  forbid the application to perform network connection according to the power saving strategy; or
  perform an unloading operation on the application according to the power saving strategy.

17. The apparatus according to claim 7, wherein the processor is further configured to:
  store the power saving strategy locally after the power saving strategy is received.

18. The apparatus according to claim 17, wherein, the processor is further configured to:
  obtain the power saving strategy locally when a disconnection from the cloud server is detected.

* * * * *